United States Patent
David (10) Patent No.: US 10,764,253 B2
(45) Date of Patent: Sep. 1, 2020

(54) SYSTEM FOR USING METADATA TO IDENTIFY AND EXTRACT SPECIFIC UPSTREAM DATA, PROVISIONING DATA BATCHES, AND PROVIDING DYNAMIC DOWNSTREAM DATA ACCESS

(71) Applicant: BANK OF AMERICA CORPORATION, Charlotte, NC (US)

(72) Inventor: Soorej Lancelot David, Huntersville, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 190 days.

(21) Appl. No.: 16/021,918

(22) Filed: Jun. 28, 2018

(65) Prior Publication Data

US 2020/0007510 A1   Jan. 2, 2020

(51) Int. Cl.
*H04L 29/06*   (2006.01)
*G06F 16/25*   (2019.01)

(52) U.S. Cl.
CPC ........ *H04L 63/0421* (2013.01); *G06F 16/258* (2019.01); *H04L 63/08* (2013.01)

(58) Field of Classification Search
CPC .... G06F 21/604; G06F 21/62; G06F 21/6245; G06F 16/258; H04L 63/08; H04L 63/0421
See application file for complete search history.

(56) References Cited

U.S. PATENT DOCUMENTS

| | | | |
|---|---|---|---|
| 6,167,405 A | 12/2000 | Rosensteel, Jr. et al. | |
| 6,208,990 B1 | 3/2001 | Suresh et al. | |
| 6,339,775 B1 | 1/2002 | Zamanian et al. | |
| 6,959,326 B1 | 10/2005 | Day et al. | |
| 7,051,334 B1 | 5/2006 | Porter et al. | |
| 7,058,615 B2 | 6/2006 | Yao | |
| 7,117,294 B1 | 10/2006 | Mi et al. | |
| 8,086,637 B1 * | 12/2011 | Tsai | G06F 21/6245 707/785 |
| 8,949,293 B2 | 2/2015 | Morsi et al. | |
| 9,015,106 B2 | 4/2015 | Nucci et al. | |
| 9,015,320 B2 * | 4/2015 | Rice | G06F 9/5055 709/225 |

(Continued)

*Primary Examiner* — Joseph P Hirl
*Assistant Examiner* — Thomas A Gyorfi
(74) *Attorney, Agent, or Firm* — Michael A. Springs; Moore & Van Allen PLLC; Nicholas C. Russell (57) ABSTRACT

A system may use metadata to identify and extract specific upstream data, provision data batches, and provide dynamic downstream data access. Workflow data is received by the system from a business process management application and modeled for downstream use. Use of a data staging engine includes utilization of a metadata repository that assists with the extraction, organization, transformation and loading of workflow data from a proprietary format to a modeled relational format. A self-service batch provisioning tool enables users and applications to request and receive batch payloads in an automated fashion. Users are presented with a graphical interface for submitting authorization credentials and justifications for workflow data request. Scope of accessible workflow data based on user-provided credentials and justifications are presented via the graphical interface and allow the user to select specific data subcategories for batch provisioning.

17 Claims, 5 Drawing Sheets

(56) References Cited

U.S. PATENT DOCUMENTS

| | | |
|---|---|---|
| 9,052,939 B2 | 6/2015 | Ferris |
| 9,158,782 B2 | 10/2015 | Nucci et al. |
| 9,436,712 B2 | 9/2016 | Srinivasan et al. |
| 9,606,995 B2 | 3/2017 | Nucci et al. |
| 9,749,327 B2 | 8/2017 | Storm |
| 9,928,379 B1 * | 3/2018 | Hoffer ................. G06F 21/6245 |
| 2004/0153908 A1 * | 8/2004 | Schiavone .......... G06F 21/6245 |
| | | 714/712 |
| 2006/0235831 A1 | 10/2006 | Adinolfi et al. |
| 2007/0083572 A1 | 4/2007 | Bland et al. |
| 2007/0214167 A1 | 9/2007 | Nair et al. |
| 2008/0243884 A1 | 10/2008 | Mehta |
| 2010/0153952 A1 | 6/2010 | Linder |
| 2012/0221696 A1 | 8/2012 | Ferris |
| 2013/0262660 A1 | 10/2013 | Theroux et al. |
| 2017/0011135 A1 * | 1/2017 | Srivastava .............. G06F 16/86 |
| 2017/0041296 A1 * | 2/2017 | Ford ................... H04L 63/0421 |
| 2018/0307859 A1 * | 10/2018 | LaFever ............. H04L 63/0407 |

\* cited by examiner

SYSTEM FOR USING METADATA TO IDENTIFY AND EXTRACT SPECIFIC UPSTREAM DATA, PROVISIONING DATA BATCHES, AND PROVIDING DYNAMIC DOWNSTREAM DATA ACCESS

FIELD

The present invention relates to a system for efficient and secure data sharing. The system may use metadata to identify and extract specific upstream data, provision data batches, and provide dynamic downstream data access.

BACKGROUND

Today there are many steps involved in transforming data from proprietary workflow management output format to a relational format for downstream applications, systems, and consumers. In addition, the process of determining authorization for specific subsets of information for downstream users remains a cumbersome process. Delivering data to downstream applications, systems, and consumers presents unique challenges and the potential for increased security problems. As such, there is a need for developing and deploying a framework for improving this process.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Embodiments of the present invention address the above needs and/or achieve other advantages by providing apparatuses (e.g., a system, computer program product and/or other devices) and methods for using metadata to identify and extract specific upstream data, provisioning data batches, and providing dynamic downstream data access. The system embodiments may comprise one or more memory devices having computer readable program code stored thereon, a communication device, and one or more processing devices operatively coupled to the one or more memory devices.

In some embodiments, the system for executing an enterprise framework for using metadata to identify and extract specific upstream data, provisioning data batches, and providing dynamic downstream data access, comprises one or more memory devices, one or more processing devices operatively coupled with the one or more memory devices comprising instructions executable by the one or more processing devices to transmit instructions to an upstream business process management application requesting party data tables, receive the party data tables comprising party data, each party data table having a plurality of corresponding parameters from a plurality of workflow applications, determine the corresponding parameters for each of the party data tables, based on the corresponding parameters for each of the party data tables, create a staging table for each workflow application, receive a request for access to party data from a requester, the request comprising requester authentication credentials, determine a party data portion comprising some or all of the party data, based on the requester authentication credentials, communicate to the requester the party data portion, receive a selection from the requester of some or all of the party data portion, resulting in a party data selection, based on the party data selection from the requester, compile a schema file for staging of the party data selection, wherein the schema file comprises instructions for accessing and using the workflow application staging tables to stage the party data selection, using the compiled schema file to access and use the workflow application staging tables, stage the party data selection in an accessible format; and communicate, to the requester, the party data selection in the accessible format.

In some embodiments, the request for access to party data further comprises a need for the data that is forwarded to a data custodian for review, and wherein the data custodian reduces the amount of available party data contained in the party data portion based on the requester's need.

In some embodiments, the system includes an on-boarding graphical user interface wherein the requester interacts with the system to communicate the request for access to party data and to communicate the party data selection.

In some embodiments, the corresponding parameters of the party data tables comprise metadata stored in a metadata repository.

In some embodiments, the party data is stored by the system using a relational database management system.

In some embodiments, the system further comprises using a data custodian to deny or approve the selection from the requester prior to compiling the schema file for staging of the party data selection.

In some embodiments, the party data portion communicated to the requester contains general categories of party data and associated with an anonymized party ID.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, where:

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Today there is a need for developing and deploying a framework for improving the process, such as by automating and simplifying the process. In the current state of the art, there is no standard common framework (e.g., distribution point) to provision data from workflow management platforms such as Pega® to downstream applications and consumers. Currently, business users depend heavily on telecommunications solutions offered by companies focused specifically on supporting enterprise workloads and information technology cloud services to provide these functions to downstream applications and consumers. Additionally, data extraction steps of current systems from business process management systems to downstream applications involve multiple data hops that lead to unnecessary data duplication. Without the ability to provision data based on specific user requests, third parties that desire access to upstream data may be sent a batch of workflow data that contains more data than needed for a particular use-case or scenario. Conventional data sharing processes often lack the ability for dynamic downstream selection of data from upstream workflow application sources, which may result in over-sharing of information with third parties and downstream users, thereby increasing the likelihood of unauthorized use or access of such information and reducing the original entity's ability to control the use of such data after it is duplicated and shared. As this data is shared with a number of third parties or downstream users, it may become difficult for a managing entity to determine how this data is being stored, utilized, and protected downstream. As such, there is a need for a system that limit the amount of workflow application information that is duplicated and shared with third parties and downstream users by offering downstream users and applications with the ability to select a limited amount of information during the request process. As described herein, the present invention provides a provisioning system and process which allows for detailed authentication, extraction, and selection of upstream workflow data for communication to third parties and downstream users on an as-needed or need-to-know basis by requiring users to submit a justification or specific use-case to be reviewed by the system before any data is duplicated and shared.

Embodiments of the present invention provide for a workflow data distribution scheme that is able to extract data from workflow application tables into relational format for downstream consumption. The invention utilizes a data management process which facilitates extraction of data from upstream In addition, the capability for dynamic requesting of limited amounts of party data from upstream workflow applications provides enhanced security and facilitates responsible management of party data.

In summary, embodiments of the invention provide a system for identifying and extracting upstream data, provisioning data batches, and providing dynamic downstream data access using a business process management software solution in conjunction with a number of other tools including, but not limited to, IBM Information Server, Metadata Workbench, and Fast Track. The system allows a user to initiate a request for data that may originate from a number of multiple workflow applications and may be stored on a plurality of information hubs. As such, the process of staging and sharing data may include receiving workflow data from a workflow management application in an XML format; and in response to receiving the workflow data, initiating an automation agent or data stage engine for modeling the workflow data into a relational format for downstream use. With each request for data, the user is required to submit a justification or use-case for review by the system or system managers. The scope and amount of data which is staged for downstream sharing may be limited based on the justification or use-case.

Figure 1:
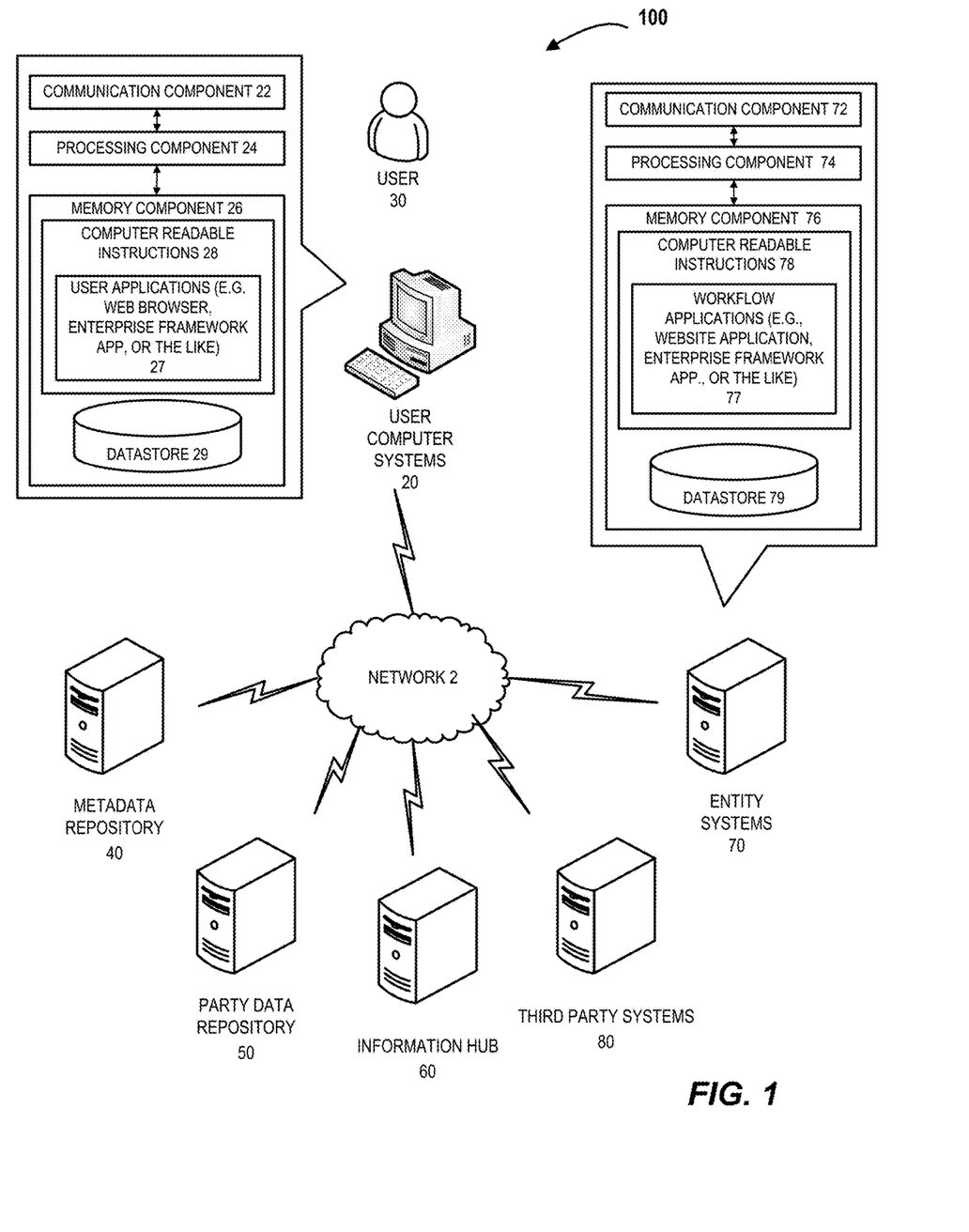
FIG. 1 illustrates a system and environment 100 for using metadata to identify and extract specific upstream data, provisioning data batches, and providing dynamic downstream data access according to embodiments of the invention.

Referring now to FIG. 1, in accordance with embodiments of the invention, the term "resource entity system" may include a computer system of any organization that processes transactions or handles data for a number of users. This may include large organizations such as banks, credit unions, savings and loan associations, card associations, settlement associations, investment companies, and financial institutions. Furthermore, embodiments of the present invention use the term "user" or "customer." It will be appreciated by someone with ordinary skill in the art that the user or customer may be a customer of a financial institution or a potential customer of a financial institution or an employee of a financial institution.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more resources or portions of a resource. Furthermore, as used herein, the term "user computing device" or "mobile device" may refer to mobile phones, personal computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

A "party", as used herein, may refer to a person or entity that specific data describes or is related to. Data is organized across the workflow applications and information hubs within the system by a party identifier, or "party ID" assigned to specific data points. As such, the system may locate and cross reference data from various information hubs and workflow applications based on the party ID.

"Requesters", as used herein, may refer to a subset of users who make a request for data from the system, and may include human users, a downstream application initiating an automated request, or an organization that initiates a request. For instance, a user may initiate a request from the system for data related to five specific individuals or entities, which they may identify using their legal name, business name, party ID, account number, or some other identifying characteristic. As stated, the system determines data related to the specific identified individuals or entities by using the party ID associated with the individual or entity, and data in the system across multiple information hubs and workflow applications is organized according to this nomenclature. As such, any data related to the individuals or entities is collectively referred to as "party data" which may be requested by a specific user known as the "requester."

A "party data portion", as used herein, refers to general categories of party data that a requester is granted to access. However, in some cases, the requester may not need or want access to the full party data portion for which they are permitted access. The system communicates this information to the requester through a user interface and allows the requester to select specific data points from the party data portion as needed. For this reason, the terminology used herein differentiates between a "party data portion," which refers to the entire subset of data categories which the requester may access, and a "party data selection," which refers to the particular data points of the party data portion that the requester selects.

A "system environment", as used herein, may refer to any information technology platform of an enterprise (e.g., a national or multi-national corporation) and may include a multitude of servers, machines, mainframes, personal computers, network devices, front and back end systems, database system and/or the like. Furthermore, the acronym "ETL" stands for "Extract, Transform and Load," steps performed in data warehousing processes which are responsible for extracting data from a source system or format and exporting the data downstream or storing the data in a database or datastore.

A "workflow application", as used herein, may refer to any number of applications used by the entity to gather party data. Workflow applications may store information and party data in information hubs, which may exist in different physical locations across the entity and across different networks across the entity. Data from workflow applications may be managed by a business process management tool, which may provide the system with information about how party data is processed and stored by workflow applications.

FIG. 1 illustrates a system and environment 100 for executing an enterprise framework for using metadata to identify and extract specific upstream data, provisioning data batches, and providing dynamic downstream data access, in accordance with embodiments of the invention. As illustrated in FIG. 1, one or more resource entity systems 70, (later referred to as the "system" or "systems") are operatively coupled, via a network 2, to user computer systems 20, metadata repository 40, party data repository 50, one or more information hubs 60, one or more third party systems 80, and/or one or more other systems (not illustrated). In this way, the user 30 (e.g., one or more associates, employees, agents, contractors, sub-contractors, third-party representatives, customers, or the like), through a user application 27 (e.g., web browser, enterprise framework application, or the like), may access workflow applications 77 (e.g., website, enterprise framework application, or the like) of the resource entity systems 70 to submit one or more commands, requests, and the like associated with party data requests, and party data storage to the resource entity systems 70. In some embodiments, the enterprise framework application or tool may be a part of an independent system or environment. In such an embodiment, the enterprise framework environment 50 may be maintained and operated by the resource entity systems 70. The enterprise framework environment may comprise one or more processing devices operatively coupled to the one or more memory devices and configured to execute computer readable code stored in the one or more memory devices.

In some embodiments, the consumer application system 30, the metadata repository 40, party data repository 50, and the one or more information hubs 60, may be a part of the resource entity systems 70. The metadata repository 40, and the party data repository 50, and information hub 60 may comprise one or more processing devices operatively coupled to the one or more memory devices and configured to execute computer readable code stored in the one or more memory devices. In some embodiments, the consumer application system 30, the metadata repository 40, and the party data repository 50 may be a part of single environment system, wherein the single environment system may be maintained by the resource entity systems 70.

The network 2 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the resource entity systems 70 generally comprise one or more communication components 72, one or more processing components 74, and one or more memory components 76. The one or more processing components 74 are operatively coupled to the one or more communication components 72 and the one or more memory components 76. As used herein, the term "processing component" generally includes circuitry used for implementing the communication and/or logic functions of a particular system. For example, a processing component 74 may include a digital signal processor component, a microprocessor component, and various analog-to-digital converters, digital-to-analog converters, and other support circuits and/ or combinations of the foregoing. Control and signal processing functions of the system are allocated between these processing components according to their respective capabilities. The one or more processing components 74 may include functionality to operate one or more software programs based on computer-readable instructions 78 thereof, which may be stored in the one or more memory components 76.

The one or more processing components 74 use the one or more communication components 72 to communicate with the network 2 and other components on the network 2, such as, but not limited to, the components of the user computer systems 20, metadata repository 40, the party data repository 50, and information hub 60, or other systems. As such, the one or more communication components 72 generally comprise a wireless transceiver, modem, server, electrical connection, electrical circuit, or other component for communicating with other components on the network 2. The one or more communication components 72 may further include an interface that accepts one or more network interface cards, ports for connection of network components, Universal Serial Bus (USB) connectors and the like. In one embodiment of the present invention, the one or more processing components 74 automatically implement one or more automated counter measures to mitigate impact of the one or more exposures.

As further illustrated in FIG. 1, the resource entity systems 70 comprise computer-readable instructions 78 stored in the memory component 76, which in one embodiment includes the computer-readable instructions 78 of the workflow application 77 (e.g., web site application, enterprise framework application, or the like). In some embodiments, the one or more memory components 76 include one or more data stores 79 for storing data related to the resource entity systems 70, including, but not limited to, data created, accessed, and/or used by the workflow application 77.

Users 30 may access the workflow application 77, or other applications, through a user computer system 20. The user computer system 20 may be a desktop, mobile device (e.g., laptop, smartphone device, PDA, tablet, or other mobile device), or any other type of computer that generally comprises one or more communication components 22, one or more processing components 24, and one or more memory components 26.

The one or more processing components 24 are operatively coupled to the one or more communication components 22 and the one or more memory components 26. The one or more processing components 24 use the one or more communication components 22 to communicate with the network 2 and other components on the network 2, such as, but not limited to, the user computer systems 20, a plurality of user computer systems 30, and/or other systems. As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and the like. Moreover, the one or more communication components 22 may include a keypad, keyboard, touch-screen, touchpad, microphone, mouse, joystick, other pointer component, button, soft key, and/or other input/output component(s) for communicating with the users 30. In some embodiments of the present invention, the enterprise framework application in the user computer systems 20 and the plurality of user computer systems 20 may enable a user interface to display information associated with the development, deployment, testing, or other portions of the batch provisioning and data request process and allow the user to receive information associated with the process.

As illustrated in FIG. 1, the user computer systems 20 may have computer-readable instructions 28 stored in the one or more memory components 26, which in one embodiment includes the computer-readable instructions 28 for user applications 27, such as event prediction application (e.g., apps, applet, or the like), portions of enterprise framework application, a web browser or other apps that allow the user 30 to take various actions, including allowing the user 30 to access applications located on other systems, or the like. In some embodiments, the user 30 utilizes the user applications 27, through the user computer systems 20, to access the workflow applications 77. Moreover, in some embodiments the user 30 may also utilize the user applications 27 to access metadata repository 40, and the party data repository 50, and information hub 60. The plurality of user computer systems 20 associated with one or more users may include similar structure as that of the user computer systems 20.

Figure 2:
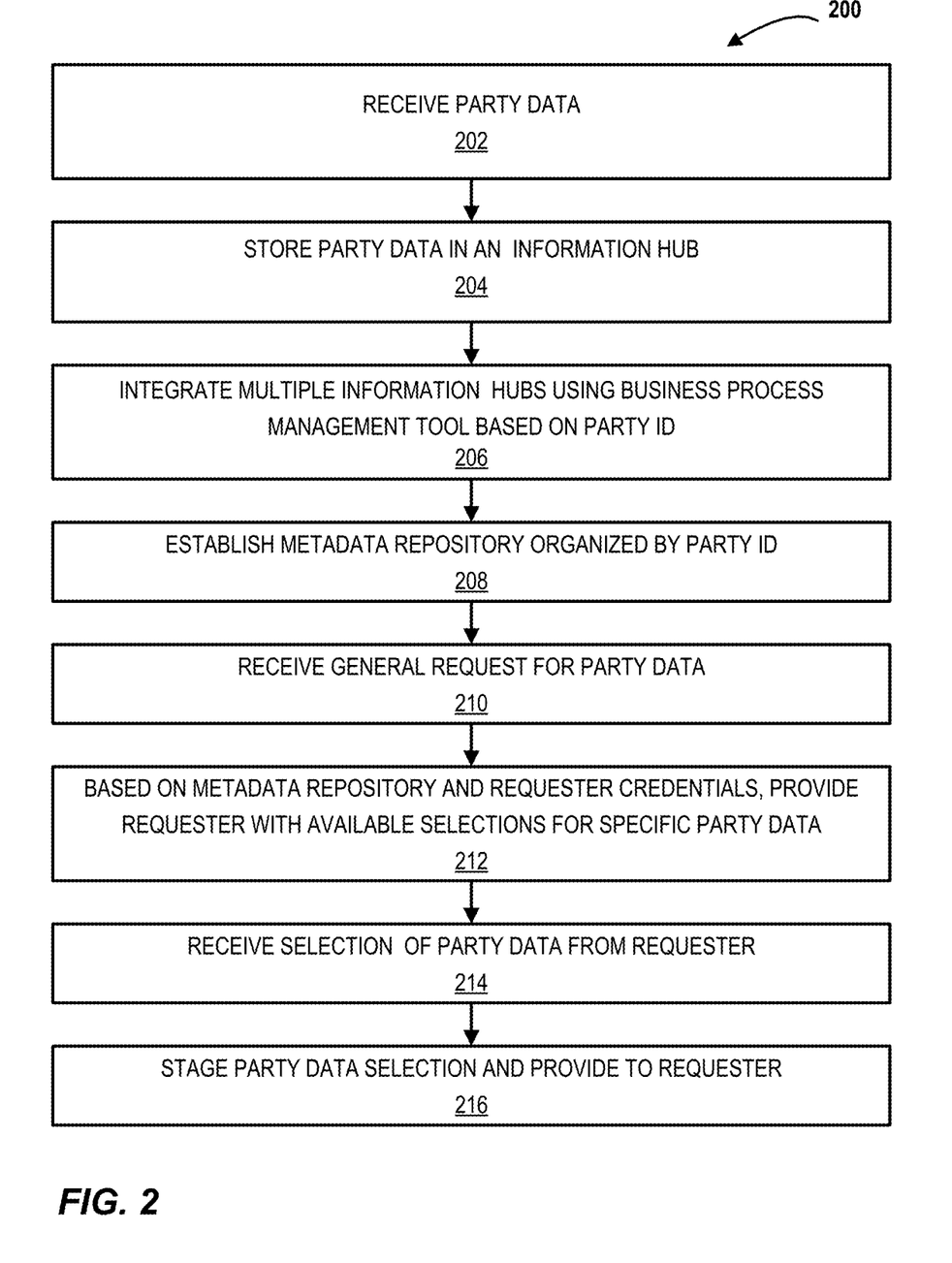
FIG. 2 illustrates a block diagram and process flow 200 for integrating party data from multiple information hubs and receiving requests and providing dynamic downstream data access according to embodiments of the invention.

Referring now to FIG. 2, a block diagram and process flow 200 for integrating party data from multiple information hubs, receiving requests, and providing dynamic downstream data access according to embodiments of the invention is provided. As shown in FIG. 2, the process flow is initiated at block 202 where the system receives party data. Party data may be received by the system in a number of ways, including either from the party itself or via a number of other sources. For instance the party may submit the data such as during an enrollment process when purchasing a product from the entity or in the process of using a web application or some other service offered by the entity. The party may communicate the party data either in person at an entity location, or online via a web application. The party may be a vendor or customer of the entity that operates the system. Party data may also be obtained by the party from third parties, which may include the party's employers, peers, or family members. In some cases, the party data may be publicly available information that the system obtains from a third party source or reporting agency. Party data may include user information, identification information (e.g., copies of driver's license, passport, and the like.), account information, resource pool information, and other data specific to the party. Party data may be quantitative, as is the case for account information or resource pool information, or may be qualitative, such as factual information or notes recorded by entity users. In other instances, the party data may comprise various observable qualities that are identified by the system and stored as the entity or system interacts with the party. This observable information may include a number of biometric parameters (e.g., physical description, fingerprint, retina scan, voice pattern recognition, speech pattern recognition, and the like) and identified party preferences that are either directly or indirectly communicated by the party.

The party data represents a wide array of possible parameters and characteristics, the party data may be stored as one or more locations throughout the entity or system, as represented in block 204 of FIG. 2. These different locations, or information hubs, contain varying kinds of information about the party. Seeing as some of the information hubs may not be in direct communication, and may exist on different upstream platforms or storage format, the system may utilize a means of integrating the various information hubs and accounting for and organizing information in a central location. As such, the system integrates the multiple information hubs using a business process management tool, as shown at block 206. The integration of party data from multiple information hubs is organized primarily by the use of a unique party ID which may be used by the system to track information about a specific party across multiple upstream and downstream platforms. In some embodiments, the business process management tool may be a Pega® business process management tool, which receives and organizes data from one or more workflow applications.

Party data may be subcategorized according to a number of characteristics. These characteristics may include details such as format, file size, date of creation or last update, sensitivity or heightened security problems, whether the data contains personally identifiable information, history/log data about when/how the data has been accessed, location where the data was originally logged, which workflow application generated the data, the source of the data, how the data may be used for reporting and sharing purposes, and the like. To this end, the system employs the use of a metadata repository that contains descriptive information about the party data and organizes the data at high level based on party ID, as shown at block 208. The metadata application may provide reports on data flow, data lineage, and the impact of changes to data resources or physical resources.

In some embodiments, the system may employ a data storage method that does not identify the party. The system may strip the party data of its identifying characteristics and anonymize the data such that the only identifiable characteristic is a system-assigned party ID. In addition to maintaining an internal database mapping various parties to their respective party data, the system may, in some embodiments, encrypt the data for secure storage such that an unauthorized user who may gain access to the data repository would not have the ability to decipher the data. By using the anonymization and encryption processes, the system deters unauthorized users from identifying the source or subject of the data in the unlikely event that they gain access to the party data without the requisite authentication.

As shown in block 210, the system may receive a general request from a user for access to party data. The user, in this instance referred to as the requester, may initiate the request through an entity device or third party device by use of a user interface to communicate with the entity system. In doing so, the requester enters authentication credentials which are communicated to the entity system. The entity system checks the authentication credentials to determine if the requester is authorized to access the entity system. If the requester is granted access, the process proceeds to block 212, wherein the entity system determines which party data the requester may select. The amount and type of data available for selection by the requester can vary based on the requester's identity, authentication credentials, predetermined clearance level, and the party for which data is requested. As such, the system consults the metadata repository to determine which party data to provide based on the specific requester criteria and other qualities of the party data as listed previously, such as heightened security problem, reporting requirements, and the like. Via the user interface, the requester is provided with an available selection for specific party data. Next, the requester selects the specific party data that it requires from the available selection, as shown in block 214. The selection is processed by the entity system and compiled and transmitted to the requester, as shown in block 216. In this way, the system limits the amount of party data moving downstream from the upstream workflow applications by subcategorizing the party data providing the data on a need-to-know basis. By doing so, the system minimizes the amount of data provided.

Figure 3:
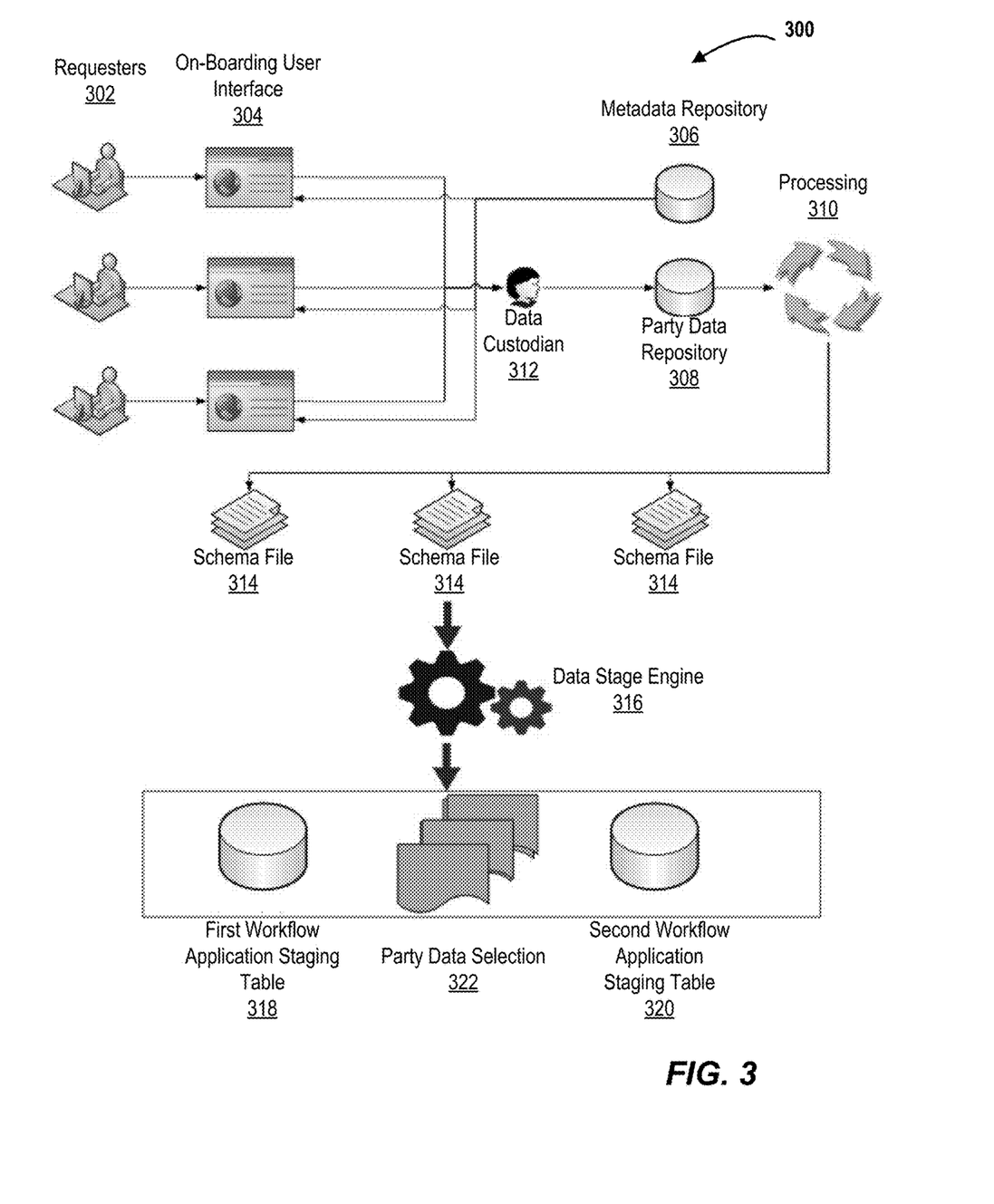
FIG. 3 illustrates a system map 300 for using metadata to identify and extract specific upstream data, provisioning data batches, and providing dynamic downstream data access according to embodiments of the invention.

Referring now to FIG. 3, a system map 300 for using metadata to identify and extract specific upstream data, provisioning data batches, and providing dynamic downstream data access according to embodiments of the invention is provided. In particular, blocks 210 through 216 as referenced in FIG. 2 will be described in more detail with respect to FIG. 3. As shown, users (e.g., requesters 302) utilize the on-boarding user interface 304 to initiate a request for party data from the entity system. The on-boarding user interface is configured such that only on-boarded users which have been pre-authorized by the entity system may access the interface to initiate a request and become a requester 302. The user is presented with an on-boarding user interface 304 to enter in their authorization credentials, which the system uses to determine if the user is an on-boarded user. If the user's authentication credentials are verified, the user may access the system to initiate a request for information. In order to initiate the request for information, the user is required to provide some necessary information about the type of data requested, the use-case or justification for the data, and the specific parties for which data is requested. The system provides a graphical user interface wherein the user may enter this information and submit it to the system for review by a data custodian 312. As described herein, a user requests data from the system is referred to as a requester 302. The requesters 302 enter their authentication credentials via the on-boarding user interface 304 and are granted access to the use system to make a general request for party data. As shown, multiple requesters 302 may make data requests through respective on-boarding user interfaces 304, which may display varying information on the provided graphical user interface depending on the requester's 302 identity, set of authentication credentials provided by the requester 302, or the requester's pre-assigned level of access or clearance with respect to workflow application data. In some embodiments, the different user interfaces may each display a different set of information depending on the location of the requesters 302 or nature of remote systems that the requesters 302 use to access the systems 70.

The requester 302 provides a justification or use-case for the general request for party data, which is forwarded on to a data custodian 312 for review. The data custodian 312 may be a human who receives and analyzes the information provided from the requester 302 to determine if the requester 302 is authorized to access the party data and determine the scope of party data that the requester 302 may access. In other embodiments, the data custodian may be an automated agent programmed to analyze the information provided by the requester 302 and generate a determination of authorization and scope of access. For instance, if the justification that the requester 302 provides is a simple reporting issue for one specific data point, the data custodian may limit the subcategories of data available to the requester 302 to exclude sensitive account information and specific resource amount information. By limiting the scope of access to party data based on the provided justification from the requester 302, the system is able to limit the dissemination of party data on an as-needed or need-to-know basis, and limit the overall sharing of data.

After the general request for party data is approved, data from the metadata repository is utilized to determine selections for specific party data based on the requester's 302 credentials and justification or use-case for requesting the party data, and such available selections may be presented to the requesters 302 via the graphical user interface. The requesters 302 may select specific party data according to the available selections presented via the graphical user interface, by selecting these categories and data fields on the graphical user interface. After the requesters 302 make these selections, the party data selection are communicated to the system for data staging. In some embodiments, the data custodian may again be utilized at this point to approve or deny the party data selection received from the requester 302. Next, the party data selection is forwarded to the party data repository 308.

Data from the party data repository 308 and the metadata repository 305 is typically further processed to generate schema files 314, as indicated by the processing step 310. Based on the location and storage of party data across information hubs and workflow applications, the schema file is generated to include instructions for gathering and staging the party data. The party data repository may contain a number of tables, data formats, and databases from workflow applications and upstream information hubs. In some embodiments, the upstream data originates from a business process management platform, such as a Pega® business process management tool, which contains data from one or more workflow applications. The business process management platform, such as Pega®, hosts the workflow data extraction process as defined by platform extraction and data service protocols. In some embodiments, the party data repository may utilize a proprietary data format such as business information exchange format (BIX), a format used to integrate upstream workflow application data, and which requires some reformatting prior to being communicated downstream to requesters 302.

The specific party data from the party data selection is identified in the party data repository and a schema file 314 is generated. The schema file 314 contains instructions for how the party data will be staged in order to prepare the party data for transmission to the requester 302. The schema file 314 determines the ETL processes for specific party data with regard to how data should be extracted and provisioned from its respective workflow application or information hub location. The schema file 314 is utilized by the data stage engine 316 to locate and format the final party data selection 322 that is communicated to the requester 302. The final party data selection 322 represents the final, re-formatted data that is sent to the requester 302. In staging the data, the data stage engine 316 utilizes workflow application staging tables to transform the data into relational format for downstream consumption. For instance, the location and organization of party data may vary across each different workflow application. As such, a workflow application staging table may contain mapping information that determines where the system can locate specific party data in a particular workflow application.

In some embodiments, the workflow application staging table may be a set of rows, columns and cells that correspond to workflow applications, party data characteristics, and locations within the workflow applications, respectively. However, it is understood that the workflow application staging tables may be organized differently in some embodiments, and in some embodiments may contain more information, such as specific code or instructions for locating, extracting, transforming, and loading party data from workflow applications or information hubs. In some embodiments, these workflow application tables are specific to each upstream workflow application, as shown by first workflow application staging table 318 and second workflow application staging table 320. It should be noted that other sources of data may be incorporated by the system at this stage. For instance there may exist on the network some legacy applications that are scheduled to retire, or which have already been retired. Data from these applications may be moved to the data staging and distribution stage or downstream applications and consumers on a one time or on demand/need-only basis whenever there is a need or demand for such data. Legacy and retired applications and information hubs may provide party data to data stage engine 316. The resulting end-product following the data stage engine 316 step is a party data selection 322 that contains all of the requested information from the specific party request. In some embodiments, the party data selection 322 is specific to a certain party ID and only contains information about one party, while in other embodiment the data stage engine 316 may incorporate directions from one or more schema files 314 in order to create a party data selection for multiple selected parties as requested by a single requester 302. The party data selection 322 may be communicated back to the requester 302 via the on-boarding user interface 304, which the requester 302 may access on the user computer systems 20.

Figure 4A:
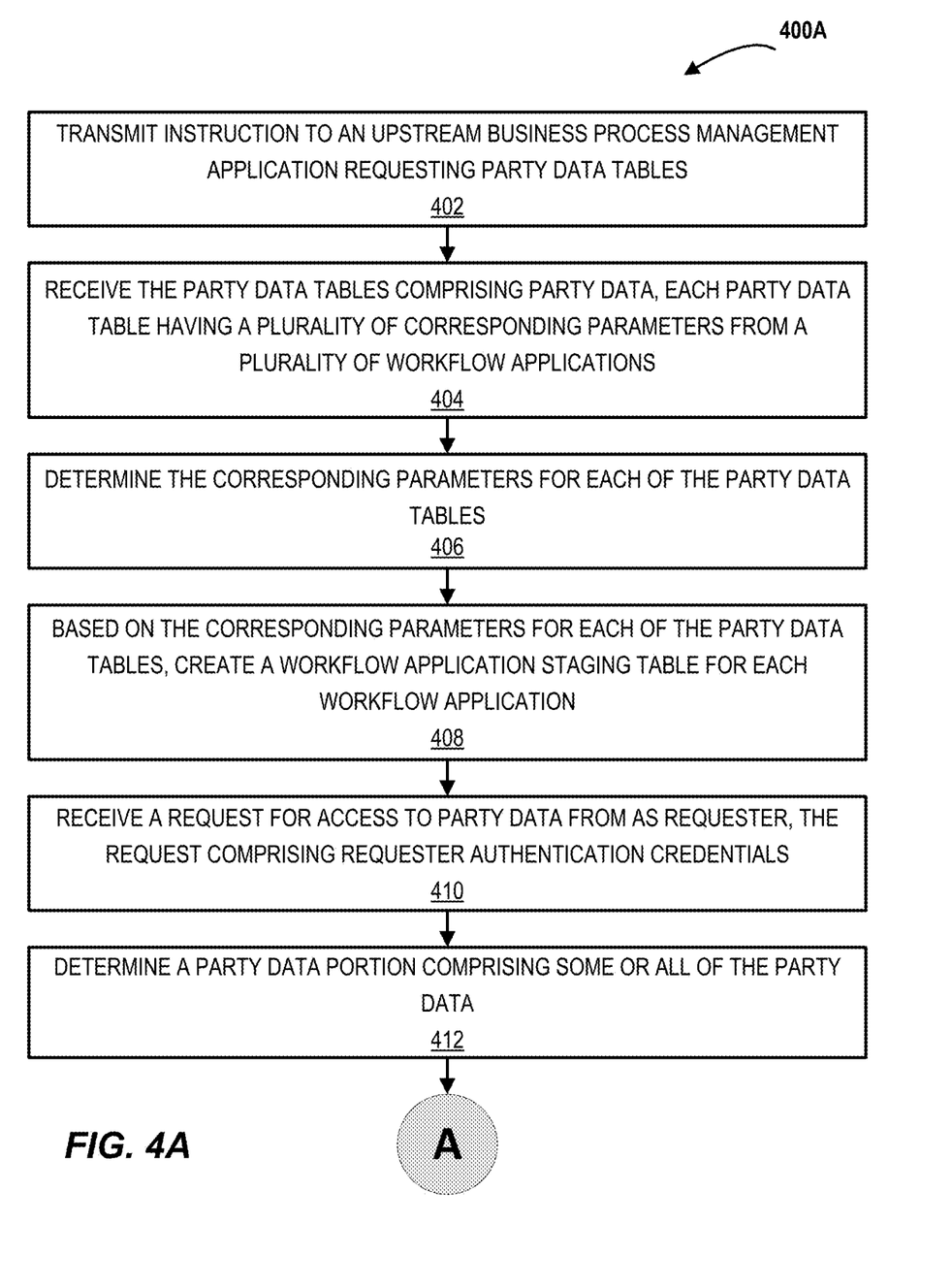
FIGS. 4A and 4B each illustrate a detailed process flow 400A and 400B, respectively, for using metadata to identify and extract specific upstream data, provisioning data batches, and providing dynamic downstream data access according to embodiments of the invention.
Figure 4B:
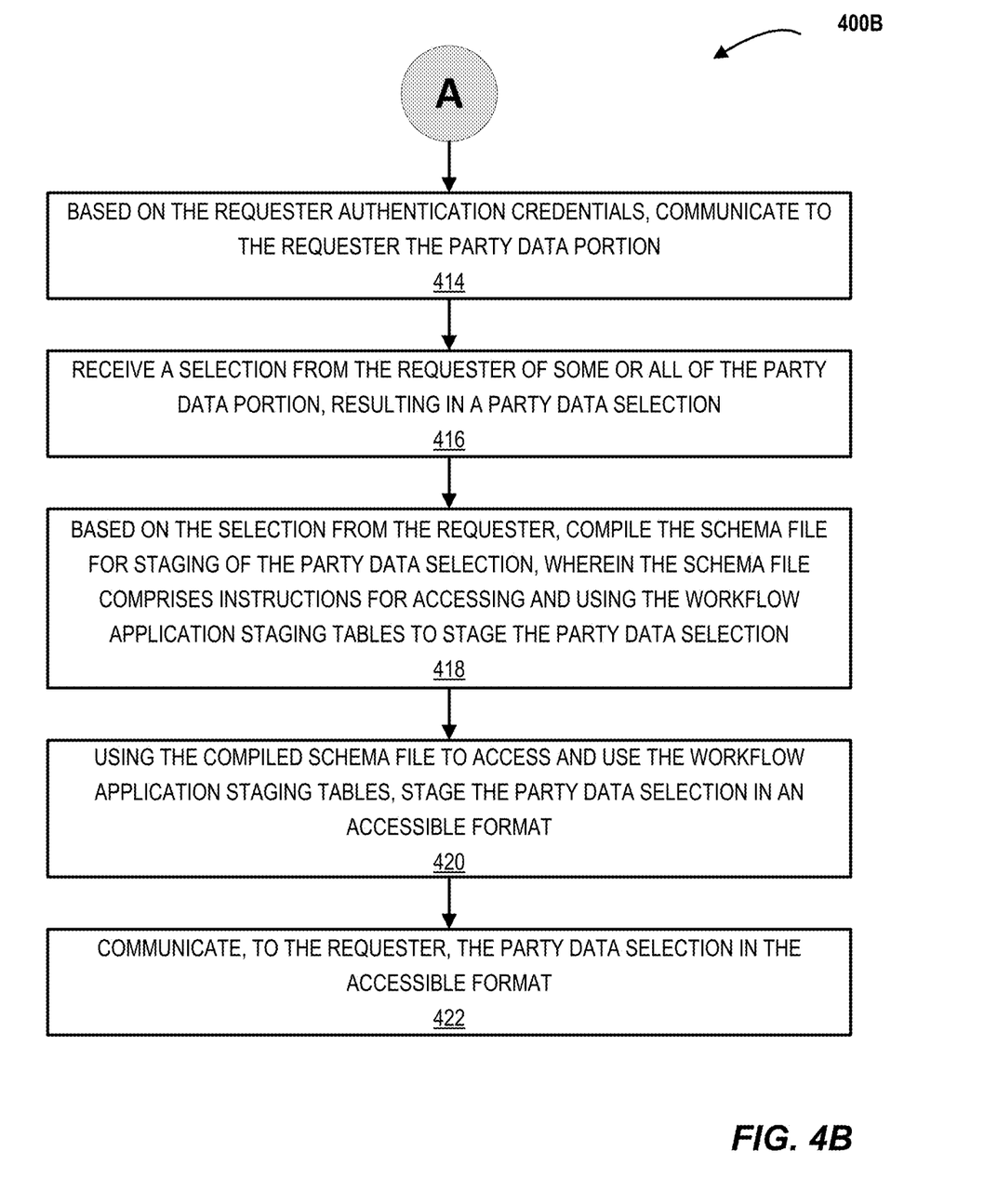

Turning now to FIGS. 4A and 4B, detailed process flows 400A and 400B for using metadata to identify and extract specific upstream data, provisioning data batches, and providing dynamic downstream data access are shown. In particular, steps 402 through 422 illustrate a more detailed view of the process of gathering, inventorying, and organizing party data, and collecting this data for downstream sharing in response to the user's request, as previously described more generally in FIG. 2. In order to organize and gather party data, the system typically inventories available party data across information hubs and workflow applications. The process begins at block 402, where the system transmits instructions to a business process management application requesting party data tables. As previously discussed, party data exists across the entity at different locations or information hubs 50 on which varying workflow applications may be utilized. The system may transmit instructions to each of these upstream information hubs 50 via the business process management application in order to begin the process of gathering, organizing and formatting party data. The process continues at block 404, wherein the system receives the party data tables comprising party data, with each party data table having a plurality of corresponding parameters from a plurality of workflow applications. For instance, each workflow application may contain a plurality of subcategories of information about the party. Each party data table may contain a plurality of corresponding parameters from a plurality of workflow applications. These parameters may be managed and selected by user 30 from within the workflow management application based on the needs of downstream workflow applications.

In order to format the party data for organization and uniform downstream use, the system determines the corresponding parameters for each of the party data tables to create the workflow application staging tables, as represented by blocks 406 and 408. At this stage, the system may communicate with the metadata repository 306 in order to determine how workflow applications record and contain various metadata subcategories. Based on the corresponding parameters for each of the party data tables, the system creates a workflow application staging table for each workflow application, as previously referenced with regard to the first workflow application table 318 and second workflow application table 320. It is understood that the system may create any number of workflow application tables that each correspond to workflow applications utilized by the entity to record party data. Once established through the process outlined in blocks 402-406, workflow application staging tables can then be utilized by the system in order to locate, retrieve, and reformat party data into relational format for downstream consumption in response to a request for the party data.

Next, as show at block 410, the system may receive a request for access to party data from a requester 302. The request includes requester 302 authentication credentials which are used by the system to determine the requester's 302 permitted level of access to the system and permitted level of access to certain party data. It is understood that the requester's 302 authentication credentials may comprise additional information obtained from the requester 302, such as a justification or reason for the request for party data. The system may determine the party data portion comprising some or all of the party data for which the requester 302 may be permitted access based on this information, as show at block 412.

The process continues in FIG. 4B, where the continued detailed process flow 400B is shown. Based on the requester 302 authentication credentials, the system communicates to the requester 302 the party data portion, or the portion of the accessible party data information to which the requester 302 has been granted access and has requested. The requester 302 is presented with a selection mechanism via the on-boarding user interface 304, wherein the requester 302 may select some or all of the party data according to their specific needs. In some embodiments, this may be presented as a selection window on a graphical user interface. In other embodiments, the information may be communicated to the requester 302 by the data custodian 312. Next, the system receives a selection from the requester 302 including some or all of the party data portion, resulting in a party data selection. As such, the party data selection represents a subset of the party data portion. Based on the requester's 302 need for information, the party data selection may comprise the entire party data portion, or alternatively may only include a limited number of subcategories of data based on a more limited need.

As shown, the process continues as the system compiles the schema file 314 for staging of the party data selection based on the party data selection received from the requester 302. The schema file 314 comprises instructions for accessing and using the workflow application staging tables to stage the party data selection, shown in block 418. Using the schema file 314, the system accesses and utilizes the workflow application staging tables to stage the party data selection in an accessible format, shown in block 420. Finally, the system communicates the party data selection in an accessible relational format, as shown in block 422.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein. In some embodiments, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for executing identification and extraction of specific upstream data, provisioning data batches, and providing dynamic downstream data access, the system comprising:

one or more memory devices;

one or more processing devices operatively coupled with the one or more memory devices comprising instructions executable by the one or more processing devices to:

transmit instructions to an upstream business process management application requesting party data tables;

receive the party data tables comprising party data, each party data table having a plurality of corresponding parameters from a plurality of workflow applications;

determine the corresponding parameters for each of the party data tables;

based on the corresponding parameters for each of the party data tables, create a staging table for each workflow application;

transmit a graphical user onboarding interface to a requestor, wherein the graphical user onboarding interface provides an interface for entering and transmitting a request for access to party data from the requestor;

receive the request for access to party data from the requester via the graphical user onboarding interface, the request comprising requester authentication credentials, subset or type of data requested, a use-case or justification for the party data, and one or more parties for which the party data is requested;

determine a party data portion comprising some or all of the party data, wherein the party data portion is a user-specific subcategorization of party data determined based on information from a metadata repository and the requestor authentication credentials;

based on information from the metadata repository and the requester authentication credentials, communicate to the requester the party data portion;

receive a selection from the requester of some or all of the party data portion, resulting in a party data selection;

based on the party data selection from the requester, compile a schema file for staging of the party data selection, wherein the schema file comprises instructions for accessing and using the workflow application staging tables to stage the party data selection;

using the compiled schema file to access and use the workflow application staging tables, stage the party data selection in an accessible format; and communicate, to the requester, the party data selection in the accessible format.

2. The system of claim 1 wherein the request for access to party data further comprises a need for the data that is forwarded to a data custodian for review, and wherein the data custodian automatically reduces a scope of available party data contained in the party data portion based on the requester's need.

3. The system of claim 1 wherein the corresponding parameters of the party data tables comprise metadata stored in the metadata repository.

4. The system of claim 1 wherein the party data is stored by the system using a relational database management system.

5. The system of claim 1 further comprising using an automated data custodian to deny or approve the party data selection from the requester prior to compiling the schema file for staging of the party data selection.

6. The system of claim 1 wherein the party data portion communicated to the requester contains general categories of party data and associated with an anonymized party ID.

7. A computer program product for executing identification and extraction of specific upstream data, provisioning data batches, and providing dynamic downstream data access, wherein the computer program product comprises at least one non-transitory computer readable medium comprising computer readable instructions, the instructions comprising:

transmit instructions to an upstream business process management application requesting party data tables;

receive the party data tables comprising party data, each party data table having a plurality of corresponding parameters from a plurality of workflow applications;

determine the corresponding parameters for each of the party data tables;

based on the corresponding parameters for each of the party data tables, create a staging table for each workflow application;

transmit a graphical user onboarding interface to a requestor, wherein the graphical user onboarding interface provides an interface for entering and transmitting a request for access to party data from the requestor;

receive the request for access to party data from the requester via the graphical user onboarding interface, the request comprising requester authentication credentials, subset or type of data requested, a use-case or justification for the party data, and one or more parties for which the party data is requested;

determine a party data portion comprising some or all of the party data, wherein the party data portion is a user-specific subcategorization of party data determined based on information from a metadata repository and the requestor authentication credentials;

based on information from the metadata repository and the requester authentication credentials, communicate to the requester the party data portion;

receive a selection from the requester of some or all of the party data portion, resulting in a party data selection;

based on the party data selection from the requester, compile a schema file for staging of the party data selection, wherein the schema file comprises instructions for accessing and using the workflow application staging tables to stage the party data selection;

using the compiled schema file to access and use the workflow application staging tables, stage the party data selection in an accessible format; and communicate, to the requester, the party data selection in the accessible format.

8. The computer program product of claim 7 wherein the request for access to party data further comprises a need for the data that is forwarded to a data custodian for review, and wherein the data custodian reduces a scope of available party data contained in the party data portion based on the requester's need.

9. The computer program product of claim 7 wherein the corresponding parameters of the party data tables comprise metadata stored in the metadata repository.

10. The computer program product of claim 7 wherein the party data is stored using a relational database management system.

11. The computer program product of claim 7 further comprising using a data custodian to deny or approve the selection from the requester prior to compiling the schema file for staging of the party data selection.

12. The computer program product of claim 7 wherein the party data portion communicated to the requester contains general categories of party data and associated with an anonymized party ID.

13. A computer implemented method for executing an enterprise framework for executing identification and extraction of specific upstream data, provisioning data batches, and providing dynamic downstream data access, the computer implemented method comprising:

transmitting instructions to an upstream business process management application requesting party data tables;

receiving the party data tables comprising party data, each party data table having a plurality of corresponding parameters from a plurality of workflow applications;

determining the corresponding parameters for each of the party data tables;

based on the corresponding parameters for each of the party data tables, creating a staging table for each workflow application;

transmitting a graphical user onboarding interface to a requestor, wherein the graphical user onboarding interface provides an interface for entering and transmitting a request for access to party data from the requestor;

receiving the request for access to party data from the requester via the graphical user onboarding interface, the request comprising requester authentication credentials, subset or type of data requested, a use-case or justification for the party data, and one or more parties for which the party data is requested;

determining a party data portion comprising some or all of the party data, wherein the party data portion is a user-specific subcategorization of party data determined based on information from a metadata repository and the requestor authentication credentials;

based on information from the metadata repository and the requester authentication credentials, communicating to the requester the party data portion;

receiving a selection from the requester of some or all of the party data portion, resulting in a party data selection;

based on the party data selection from the requester, compiling a schema file for staging of the party data selection, wherein the schema file comprises instructions for accessing and using the workflow application staging tables to stage the party data selection;

using the compiled schema file to access and use the workflow application staging tables, staging the party data selection in an accessible format; and communicating, to the requester, the party data selection in the accessible format.

14. The computer implemented method of claim 13 wherein the request for access to party data further comprises a need for the data that is forwarded to a data custodian for review, and wherein the data custodian reduces a scope of available party data contained in the party data portion based on the requester's need.

15. The computer implemented method of claim 13 wherein the corresponding parameters of the party data tables comprise metadata stored in the metadata repository.

16. The computer implemented method of claim 13 further comprising using a data custodian to deny or approve the selection from the requester prior to compiling the schema file for staging of the party data selection.

17. The computer implemented method of claim 13 wherein the party data portion communicated to the requester contains general categories of party data and does not display specific party data information before the party data selection is communicated to the requester in the accessible format.

* * * * *